(12) United States Patent
Lin

(10) Patent No.: US 9,965,436 B2
(45) Date of Patent: May 8, 2018

(54) COST-EFFECTIVE DEVICE INTERFACE FOR DATA INPUT AND OUTPUT

(71) Applicant: MediaTek Inc., Hsinchu (TW)

(72) Inventor: Chih-Chun Lin, Taipei (TW)

(73) Assignee: MEDIATEK INC., Hsin-Chu (TW)

( * ) Notice: Subject to any disclaimer, the term of this patent is extended or adjusted under 35 U.S.C. 154(b) by 162 days.

(21) Appl. No.: 14/970,498

(22) Filed: Dec. 15, 2015

(65) Prior Publication Data

US 2016/0170932 A1    Jun. 16, 2016

Related U.S. Application Data

(60) Provisional application No. 62/188,889, filed on Jul. 6, 2015.

(51) Int. Cl.
| | | |
|---|---|---|
| *G06F 13/42* | (2006.01) | |
| *G06F 13/28* | (2006.01) | |
| *G06F 13/40* | (2006.01) | |

(52) U.S. Cl.
CPC ........ *G06F 13/4282* (2013.01); *G06F 13/287* (2013.01); *G06F 13/4022* (2013.01)

(58) Field of Classification Search
None
See application file for complete search history.

(56) References Cited

U.S. PATENT DOCUMENTS

| | | | | |
|---|---|---|---|---|
| 2016/0170929 A1* | 6/2016 | Pethe | ................... | G06F 13/102 710/313 |
| 2016/0259005 A1* | 9/2016 | Menon | ............... | G01R 31/3177 |
| 2016/0285757 A1* | 9/2016 | Srivastava | .............. | H04L 12/10 |

* cited by examiner

*Primary Examiner* — Farley Abad
*Assistant Examiner* — Dayton Lewis-Taylor
(74) *Attorney, Agent, or Firm* — Han IP Corporation; Andy M. Han

(57) ABSTRACT

A technique, as well as select implementations thereof, pertaining to a cost-effective device interface for data input and output is described. A device may include a first circuit, a plurality of Universal Serial Bus (USB) Type C connections, and a multiplexer coupled between the first circuit and the USB Type C connections. The first circuit may include a first connection and a second connection. The USB Type C connections may include at least a SBU1 connection and a SBU2 connection. The multiplexer may be configured to switch the SBU1 and SBU2 connections of the USB Type C connections to alternatively connect to either the first connection or the second connection of the first circuit in response to receiving a switch signal.

28 Claims, 8 Drawing Sheets

COST-EFFECTIVE DEVICE INTERFACE FOR DATA INPUT AND OUTPUT

CROSS REFERENCE TO RELATED PATENT APPLICATION

The present disclosure claims the priority benefit of U.S. Provisional Patent Application No. 62/188,889, filed on 6 Jul. 2015, which is incorporated by reference in its entirety.

TECHNICAL FIELD

The present disclosure is generally related to device connection and interface and, more particularly, to a cost-effective device interface for data input and output.

BACKGROUND

Unless otherwise indicated herein, approaches described in this section are not prior art to the claims listed below and are not admitted to be prior art by inclusion in this section.

With the growing popularity of portable devices and wearable devices, more and more different types of sensors and auxiliary devices are available for portable and wearable devices on the market. Typically a portable or wearable device is equipped with one or more Universal Serial Bus (USB) connectors through which one or more sensors and/or auxiliary devices can interface and connect to the portable or wearable device. However, to enable the use of a conventional USB connector, an additional integrated-circuit (IC) chip is often required to connect a differential data pair of the conventional USB connector, namely the data plus/data minus (DP/DM) differential lines, to an Inter-Integrated Circuit ($I^2C$) bus of the portable or wearable device. The requirement of the additional IC chip adds cost, which is undesirable. Moreover, when debugging through a conventional USB connector, a USB switch is often required to convert the USB DP/DM signals to universal asynchronous receiver/transmitter (UART) transmit (TX) and receive (RX) signals. The requirement of the USB switch adds cost and downgrades signal quality, which is also undesirable. Furthermore, although some portable and wearable devices may have built-in sensor(s), lower-end portable and wearable devices may not be equipped with sensors such as pressure sensor, hygrometer, gas detector or ultraviolet (UV) sensor.

SUMMARY

The following summary is illustrative only and is not intended to be limiting in any way. That is, the following summary is provided to introduce concepts, highlights, benefits and advantages of the novel and non-obvious techniques described herein. Select, not all, implementations are further described below in the detailed description. Thus, the following summary is not intended to identify essential features of the claimed subject matter, nor is it intended for use in determining the scope of the claimed subject matter.

In one example implementation, a device may include a first circuit, a plurality of USB Type C connections, and a multiplexer coupled between the first circuit and the USB Type C connections. The first circuit may include a first connection and a second connection. The USB Type C connections may include at least a SBU1 connection and a SBU2 connection. The multiplexer may be configured to switch the SBU1 and SBU2 connections of the USB Type C connections to alternatively connect to either the first connection or the second connection of the first circuit in response to receiving a switch signal.

In another example implementation, a device may include a first circuit, a reversible-plug connector, a multiplexer and a logic. The first circuit may include a first connection and a second connection. The reversible-plug connector may be connectable to an external device in at least two ways. The reversible-plug connector may include at least a first communication connection and a second communication connection. The multiplexer may be coupled between the first circuit and the reversible-plug connector. The multiplexer may be configured to switch the first and second communication connections of the reversible-plug connector to alternatively connect to either the first connection or the second connection of the first circuit in response to receiving a switch signal. The logic may be coupled to at least one of the first circuit, the reversible-plug connector and the multiplexer. The logic may be configured to detect whether the external device is successfully connected to the reversible-plug connector and generate the switch signal according to a result of the detecting.

In yet another example implementation, a device may include a first circuit, a plurality of USB Type C connections, and a multiplexer. The first circuit may include either or both of an $I^2C$ bus and a UART. The $I^2C$ bus may include an I2C-1 connection coupled to a first connection of the first circuit. The $I^2C$ bus may also include an I2C-2 connection coupled to a second connection of the first circuit. The UART may include a UART1 connection coupled to the first connection of the first circuit. The UART may also include a UART2 connection coupled to the second connection of the first circuit. The USB Type C connections may include at least a SBU1 connection and a SBU2 connection. The multiplexer may be coupled between the first circuit and the USB Type C connections. The multiplexer may be configured to switch the SBU1 and SBU2 connections of the USB Type C connector to alternatively connect to either the first connection or the second connection of the first circuit in response to receiving a switch signal.

Compared to conventional approaches, implementations of the present disclosure do not require the addition of an IC chip to connect to an $I^2C$ bus. Moreover, implementations of the present disclosure do not require the addition of a USB switch to allow debugging. Advantageously, the additional cost associated with conventional approaches may be avoided with implementations of the present disclosure.

BRIEF DESCRIPTION OF THE DRAWINGS

The accompanying drawings are included to provide a further understanding of the disclosure, and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation in order to clearly illustrate the concept of the present disclosure.

DETAILED DESCRIPTION OF PREFERRED EMBODIMENTS

Overview

Figure 1:
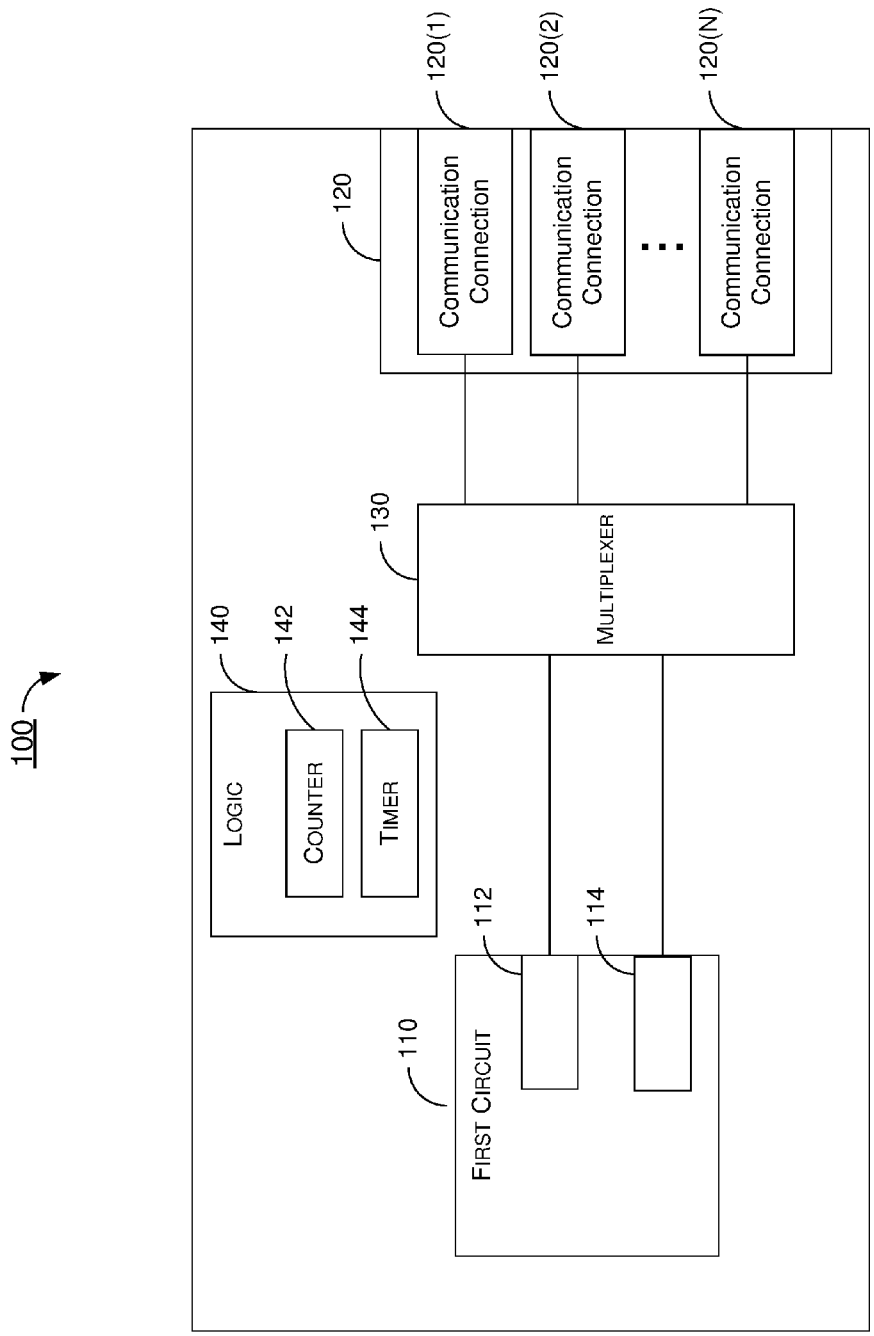
FIG. 1 is a block diagram of an example device in accordance with the present disclosure.

FIG. 1 illustrates an example device 100 in accordance with the present disclosure. Referring to FIG. 1, device 100 may include a first circuit 110, a reversible-plug connector 120 and a multiplexer 130. First circuit 110 may include a first connection 112 and a second connection 114. Reversible-plug connector 120 may be configured to connect to an external device (e.g., an add-on sensor, an auxiliary device or a cable) in at least two ways. Reversible-plug connector 120 may include a number of communication connections 120(1)-120(N), with N being a positive integer greater than 1. For instance, reversible-plug connector 120 may include a first communication connection 120(1) and a second communication connection 120(2). Multiplexer 130 may be coupled between first circuit 110 and reversible-plug connector 120. Multiplexer 130 may be configured to switch the first and second communication connections 120(1) and 120(2) of reversible-plug connector 120 to alternatively connect to either first connection 112 or second connection 114 of first circuit 110.

Device 100 may also include a logic 140. Logic 140 may be coupled to one, some or all of first circuit 110, reversible-plug connector 120 and multiplexer 130. Logic 140 may be configured to detect whether the external device is successfully connected to reversible-plug connector 120 and generate a switch signal according to a result of the detecting. Multiplexer 130 may be configured to switch the first and second communication connections 120(1) and 120(2) of reversible-plug connector 120 to alternatively connect to either first connection 112 or second connection 114 of first circuit 110 in response to receiving the switch signal from logic 140. For instance, multiplexer 130 may switch from connecting first connection 112 to first communication connection 120(1) and connecting second connection 114 to second communication connection 120(2) to connecting first connection 112 to second communication connection 120(2) and connecting second connection 114 to first communication connection 120(1), and vice versa.

Logic 140 may be configured to detect whether the external device is successfully connected to reversible-plug connector 120. For example, logic 140 may be configured to attempt to read a device identification (ID) of the external device for a number of times to detect whether the external device is successfully connected to reversible-plug connector 120. Logic 140 may be also configured to generate the switch signal to alternate a connection between first communication and second communication connections 120(1) and 120(2) of reversible-plug connector 120 and first and second connections 112 and 114 of first circuit 110 through multiplexer 130 in response to each unsuccessful attempt to read the device ID of the external device during the number of times of attempting.

In some implementations, logic 140 may include a counter 142 configured to change a count value after each unsuccessful attempt to read the device ID of the external device. For instance, counter 142 may increment the count value after each unsuccessful attempt to read the device ID of the external device. Logic 140 may be configured to stop attempting to read the device ID of the external device upon the count value exceeding a threshold count. That is, after attempting to read the device ID up to a threshold number of times, logic 140 may stop to attempt to read the device ID of the external device. Alternatively or additionally, logic 140 may include a timer 144 configured to measure an amount of time elapsed during attempting to read the device ID of the external device. Accordingly, logic 140 may be configured to stop attempting to read the device ID of the external device upon the amount of time elapsed during the attempting to read the device ID of the external device exceeding a threshold time. That is, after attempting to read the device ID up to a threshold amount of time, logic 140 may stop to attempt to read the device ID of the external device.

In some implementations, first circuit 110 may include an I²C bus. Correspondingly, first connection 112 may include an I2C-1 connection of the I²C bus, and second connection 114 may include an I2C-2 connection of the I²C bus. In such case, first circuit 110 may be configured to provide a Serial Clock Line (SCL) signal through the I2C-1 connection and provide a Serial Data Line (SDA) signal through the I2C-2 connection. Alternatively or additionally, first circuit 110 may include a UART. Correspondingly, first connection 112 may include a UART1 connection of the UART, and second connection 114 may include a UART2 connection of the UART. In such case, first circuit 110 may be configured to provide a UART_TX signal through the UART1 connection and provide a UART_RX signal through the UART2 connection.

In some implementations, reversible-plug connector 120 may include a USB Type C connector. Correspondingly, first communication connection 120(1) may include a SBU1 connection of the USB Type C connector, and second communication connection 120(2) may include a SBU2 connection of the USB Type C connector.

Advantageously, an end user of device 100 may plug in an external device, whether a sensor, auxiliary device or cable, into reversible-plug connector 120 in one of at least two ways (e.g., with a certain side of a connector of the external device facing up or facing down when plugged into reversible-plug connector 120). Moreover, with device 100, there is no need for an additional IC chip to convert, switch or otherwise connect a differential data pair of the conventional USB connector to an I²C bus, and there is no need for an additional USB switch to convert conventional USB DP/DM signals to UART TX/RX signals for debugging.

Furthermore, device 100 may be compatible with external devices that utilize an I²C bus. When the external device is a charging cable with a built-in temperature sensor, SBU1 and SBU2 connections of reversible-plug connector 120 may be used to transmit I²C data and, based on such data, logic 140 may lower the amount of charging current to prevent overheating, thus ensuring the safe use and protection of the external device as well as device 100.

Figure 6:
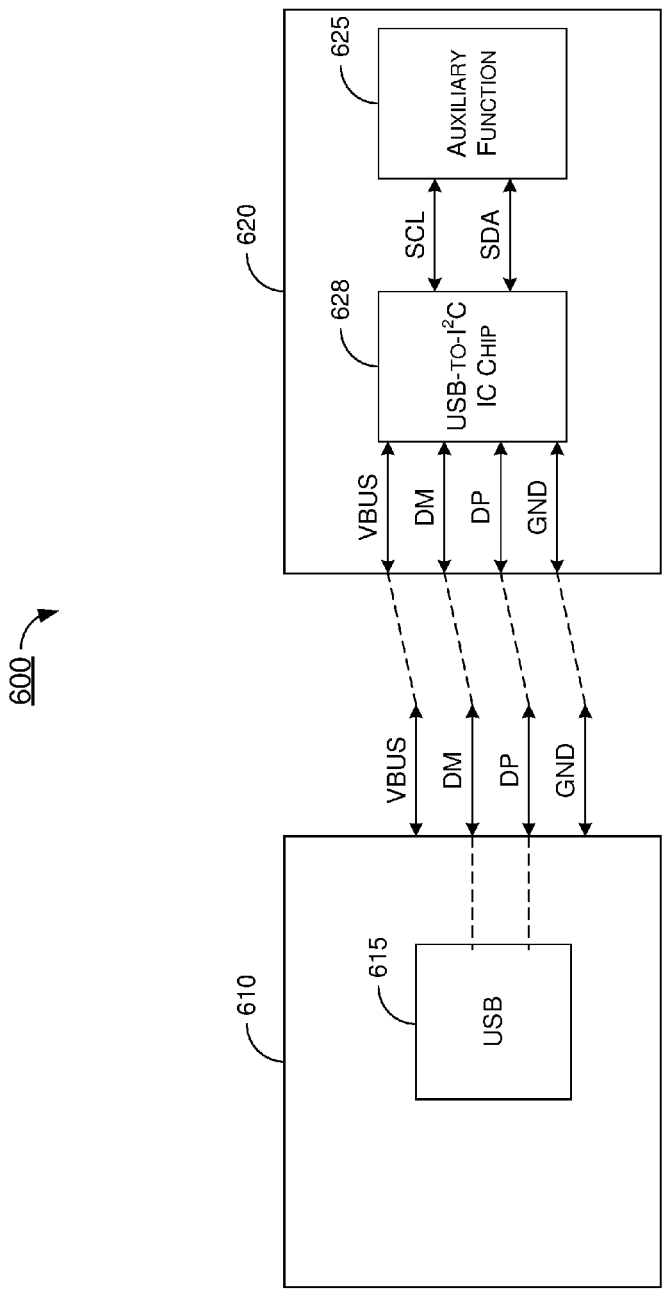
FIG. 6 is a diagram of a scenario of a conventional device in connection with an auxiliary device.
Figure 7:
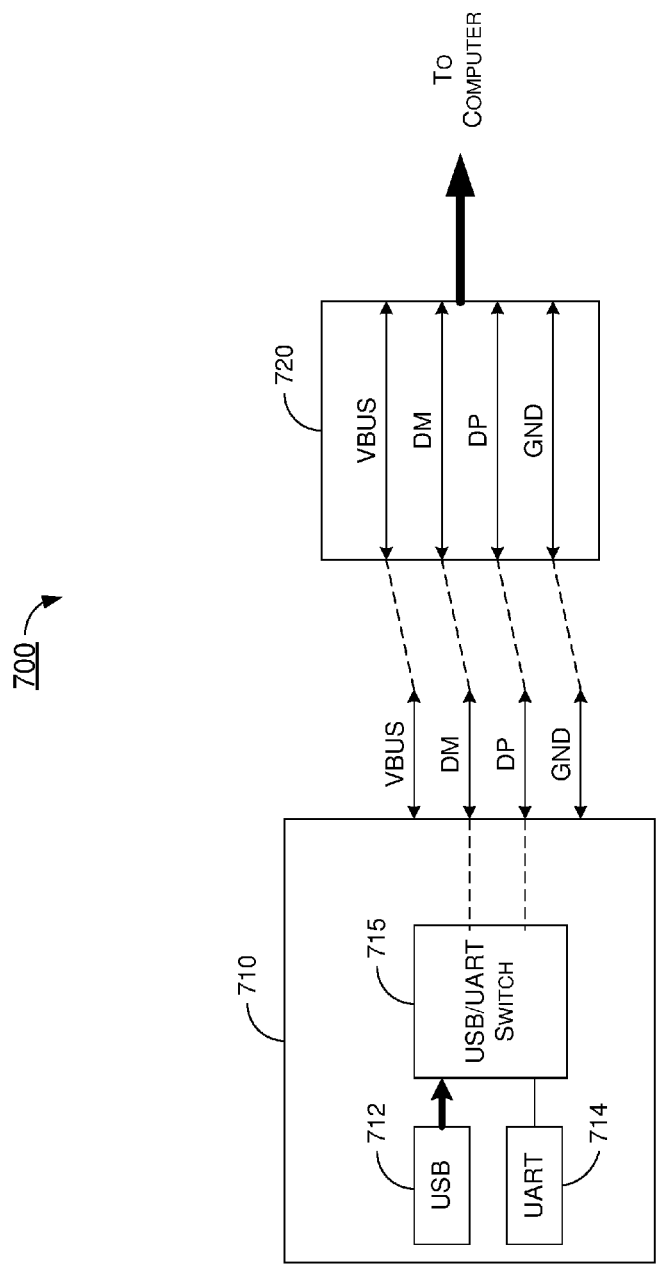
FIG. 7 is a diagram of a scenario of a conventional device in connection with a USB cable.
Figure 8:
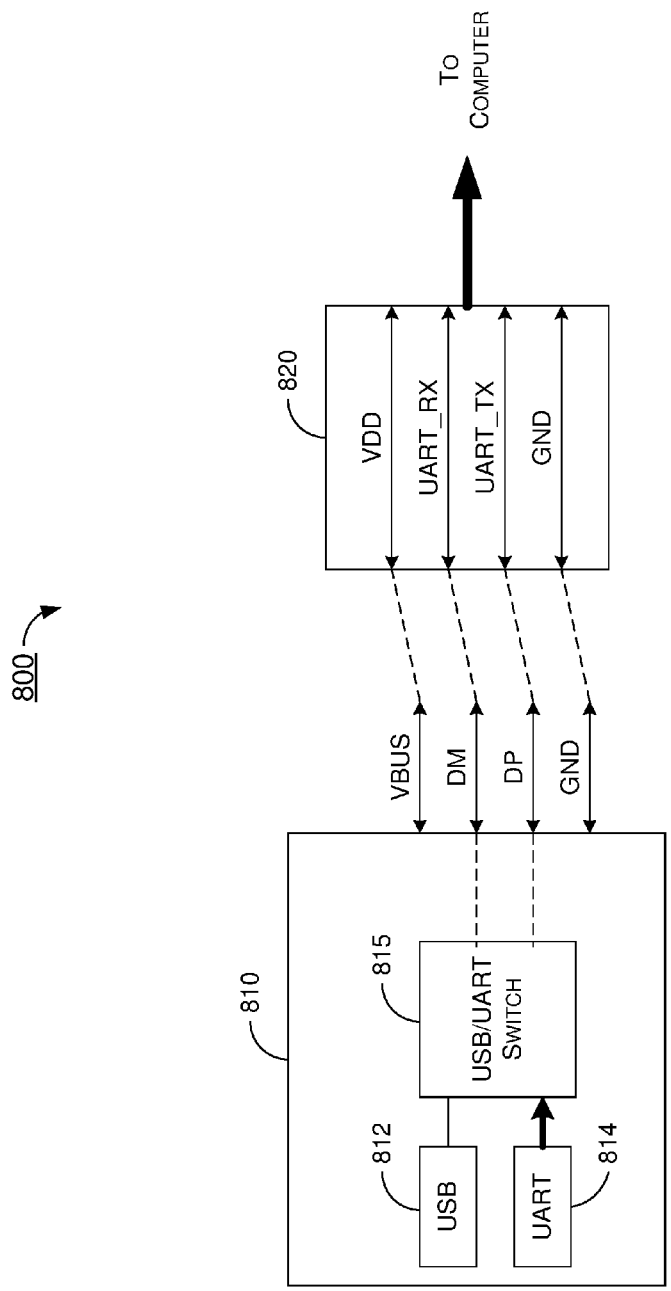
FIG. 8 is a diagram of a scenario of a conventional device in connection with a UART cable.

For comparison and to aid better appreciation of the benefits provided by device 100, a conventional device and a typical way of its usage is shown in each of FIG. 6-FIG. 8. FIG. 6 illustrates a scenario 600 of a conventional device 610 in connection with an auxiliary device 620. FIG. 7 illustrates a scenario 700 of a conventional device 710 700 in connection with a USB cable 720. FIG. 8 illustrates a scenario 800 of a conventional device 810 in connection with a UART cable 820.

Referring to FIG. 6, device 610 includes a conventional USB connector 615, which includes a VBUS connection, a DM connection, a DP connection and a GND connection. Auxiliary device 620 includes a circuit 625 that performs one or more auxiliary functions and transmits/receives signals via a SCL connection and a SDA connection. Therefore, an additional USB-to-I²C IC chip 628 is required in auxiliary device 620 to function as a bridge between the DM and DP signals to and from device 610 and the SCL and SDA signals to and from circuit 625.

Referring to FIG. 7, device 710 includes a USB connector 712 and a UART 714 connector. In order for device 710 to connect to and transmit data to and from USB cable 720, a USB/UART switch 715 is additionally required in device 710.

Referring to FIG. 8, device 810 includes a USB connector 812 and a UART 814 connector. In order for device 810 to connect to and transmit data to and from UART cable 820, a USB/UART switch 815 is required in device 810.

In FIG. 7, USB/UART switch 715 is configured for transmitting data and debugging. When data is to be transmitted, USB/UART switch 715 is switched to activate a USB path from USB 712, as shown by an arrow from USB 712 to USB/UART switch 715 in FIG. 7. In FIG. 8, when debugging is performed, USB/UART switch 815 is switched to activate a UART path from UART 814, as shown by an arrow from UART 814 to USB/UART switch 815 in FIG. 8. However, the implementation of USB/UART 715/815 requires an additional cost, not to mention that it may downgrade the quality of the USB signal.

Example Implementations

Figure 2:
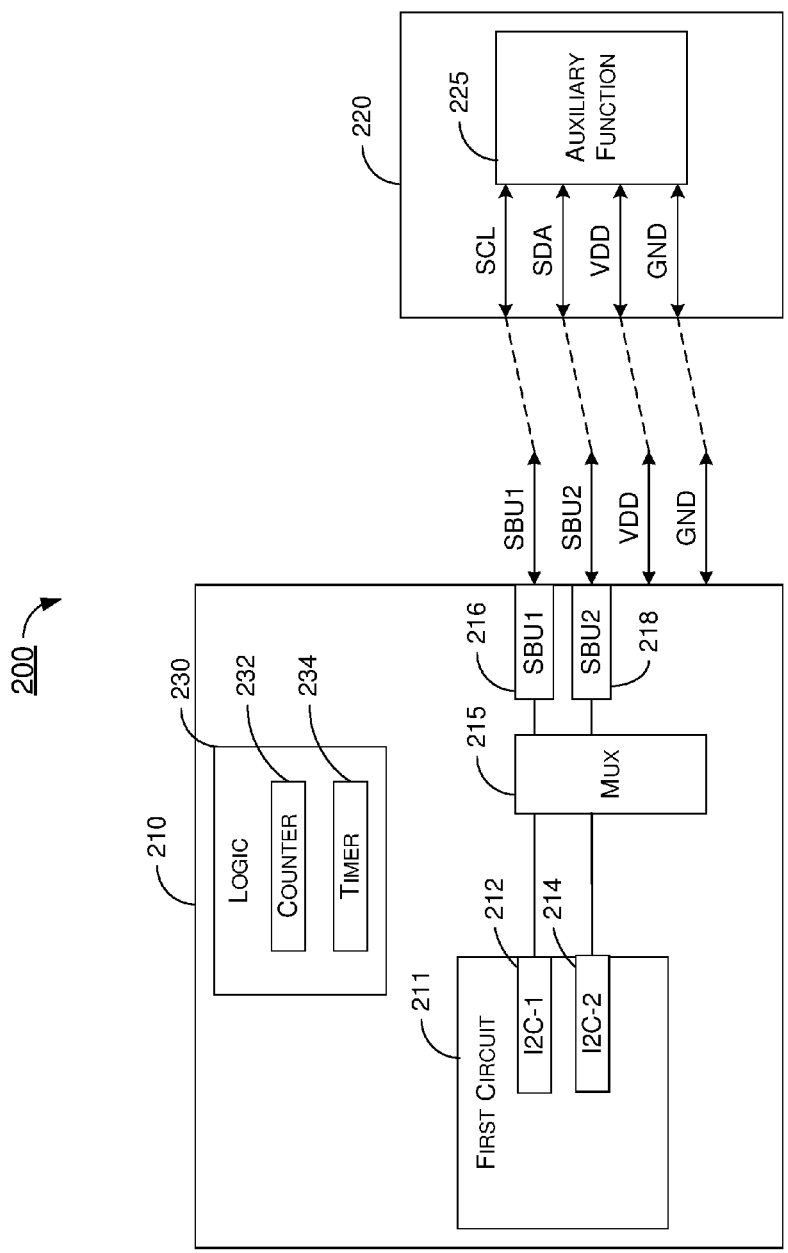
FIG. 2 is a diagram of an example scenario of an example device in connection with an auxiliary device in accordance with an implementation of the present disclosure.

FIG. 2 illustrates an example scenario 200 of an example device 210 in connection with an auxiliary device 220 in accordance with an implementation of the present disclosure. Referring to FIG. 2, device 210 may include a first circuit 211, a number of USB Type C connections including at least a SBU1 connection 216 and a SBU2 connection 218, and a multiplexer 215 coupled between first circuit 211 and the USB Type C connections. First circuit 211 may include a first connection 212 and a second connection 214. First circuit 211 may include an I²C bus. Correspondingly, first connection 212 may include an I2C-1 connection of the I²C bus, and second connection 214 may include an I2C-2 connection of the I²C bus. First circuit 211 may be configured to provide a SCL signal through the I2C-1 connection and provide a SDA signal through the I2C-2 connection. Multiplexer 215 may be configured to switch the SBU1 and SBU2 connections 216 and 218 of the USB Type C connections to alternatively connect to either first connection 212 or second connection 214 of first circuit 211 in response to receiving a switch signal. For instance, multiplexer 215 may switch from connecting first connection 212 to SBU1 connection 216 and connecting second connection 214 to SBU2 connection 218 to connecting first connection 212 to SBU2 connection 218 and connecting second connection 214 to SBU1 connection 216, and vice versa.

Device 210 may also include a logic 230 coupled to at least one of first circuit 211, the USB Type C connections (e.g., SBU1 connection 216 and SBU2 connection 218) and multiplexer 215. Logic 230 may be configured to detect whether auxiliary device 220 is successfully connected to the USB Type C connections and generate the switch signal according to a result of the detecting. Logic 230 may be configured to attempt to read a device ID of auxiliary device 220 for a number of times to detect whether auxiliary device 220 is successfully connected to the USB Type C connections. Logic 230 may be also configured to generate the switch signal to alternate a connection between SBU1 and SBU2 connections 216 and 218 of the USB Type C connections and first and second connections 212 and 214 of first circuit 211 through multiplexer 215 in response to each unsuccessful attempt to read the device ID of auxiliary device 220 during the number of times of attempting.

In some implementations, logic 230 may include a counter 232 configured to change a count value after each unsuccessful attempt to read the device ID of auxiliary device 220. Logic 230 may stop attempting to read the device ID of auxiliary device 220 upon the count value exceeding a threshold count. Alternatively or additionally, logic 230 may include a timer 234 configured to measure an amount of time elapsed during attempting to read the device ID of auxiliary device 220. Logic 230 may stop attempting to read the device ID of auxiliary device 220 upon the amount of time elapsed during the attempting to read the device ID of auxiliary device 220 exceeding a threshold time.

Thus, in device 210, the SCL and SDA signals may be transmitted to the I2C bus via the SBU1 and SBU2 connections 212 and 214. The utilization of multiplexer 215 allows auxiliary device 220 to be connected to the USB Type C connections in one of two ways (e.g., with a certain side of a connector of auxiliary device 220 facing up or facing down when connected to USB Type C connections of device 210). In order for device 210 to execute or otherwise benefit from the auxiliary function 225 of auxiliary device 220, a software upgrade or update on the part of device 210 may be performed to provide support or necessary driver for device 210 to utilize auxiliary function 225.

Figure 3:
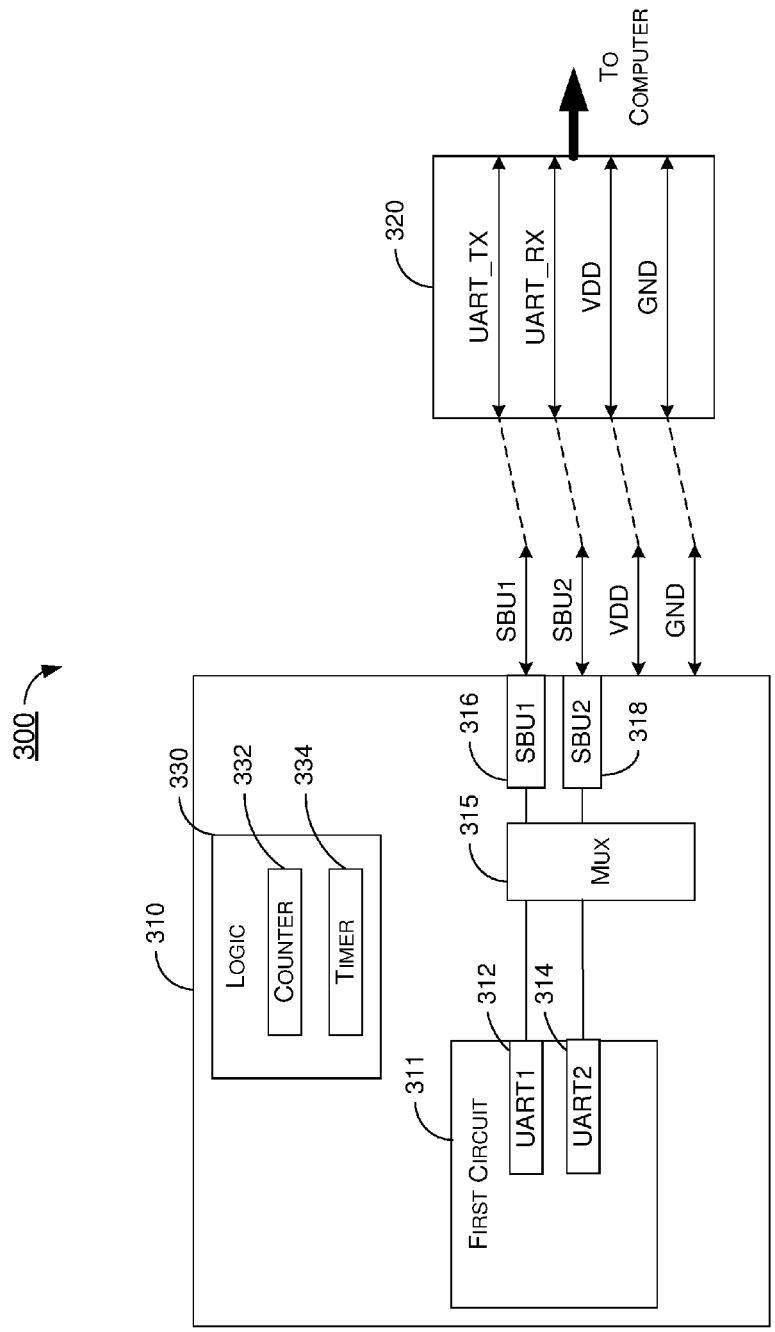
FIG. 3 is a diagram of an example scenario of an example device in connection with a UART cable in accordance with an implementation of the present disclosure.

FIG. 3 is a diagram of an example scenario 300 of an example device 310 in connection with a UART cable 320 in accordance with an implementation of the present disclosure. Referring to FIG. 3, device 310 may include a first circuit 311, a number of USB Type C connections including at least a SBU1 connection 316 and a SBU3 connection 318, and a multiplexer 315 coupled between first circuit 311 and the USB Type C connections. First circuit 311 may include a first connection 312 and a second connection 314. First circuit 311 may include a UART. Correspondingly, first connection 312 may include a UART1 connection of the UART, and second connection 314 may include a UART2 connection of the UART. First circuit 311 may be configured to provide a UART_TX signal through the UART1 connection and provide a UART_RX signal through the UART2 connection. Multiplexer 315 may be configured to switch the SBU1 and SBU2 connections 316 and 318 of the USB Type C connections to alternatively connect to either first connection 312 or second connection 314 of first circuit 311 in response to receiving a switch signal. For instance, multiplexer 315 may switch from connecting first connection 312 to SBU1 connection 316 and connecting second connection 314 to SBU2 connection 318 to connecting first connection 312 to SBU2 connection 318 and connecting second connection 314 to SBU1 connection 316, and vice versa.

Device 310 may also include a logic 330 coupled to at least one of first circuit 311, the USB Type C connections (e.g., SBU1 connection 316 and SBU2 connection 318) and multiplexer 315. Logic 330 may be configured to detect whether UART cable 320 is successfully connected to the USB Type C connections and generate the switch signal according to a result of the detecting. Logic 330 may be configured to attempt to read a device ID of UART cable 320 for a number of times to detect whether UART cable 320 is successfully connected to the USB Type C connections. Logic 330 may be also configured to generate the switch signal to alternate a connection between SBU1 and SBU2 connections 316 and 318 of the USB Type C connections and first and second connections 312 and 314 of first circuit 311 through multiplexer 315 in response to each unsuccessful attempt to read the device ID of UART cable 320 during the number of times of attempting.

In some implementations, logic 330 may include a counter 332 configured to change a count value after each unsuccessful attempt to read the device ID of UART cable 320. Logic 330 may stop attempting to read the device ID of UART cable 320 upon the count value exceeding a threshold count. Alternatively or additionally, logic 330 may include a timer 334 configured to measure an amount of time elapsed during attempting to read the device ID of UART cable 320. Logic 330 may stop attempting to read the device ID of UART cable 320 upon the amount of time elapsed during the attempting to read the device ID of UART cable 320 exceeding a threshold time.

Thus, in device 310, the UART_TX and UART_RX signals may be transmitted to the UART via the UART1 and UART2 connections 312 and 314. The utilization of multiplexer 315 allows UART cable 320 to be connected to the USB Type C connections in one of two ways (e.g., with a certain side of a connector of UART cable 320 facing up or facing down when connected to USB Type C connections of device 310). Regarding the power domain of UART, device 310 may connect to and operate with UART cable 320 based on a UART power domain provided by a vendor of device 310. Upon power-power, device 310 may detect whether a connection is established and, in an event that no connection is detected, multiplexer 315 may switch the connections between UART1 and UART2 connections 312 and 314 and SBU1 and SBU2 connections 316 and 318, thus allowing UART cable 320 to be connected to device 310 in one of two ways.

Figure 4:
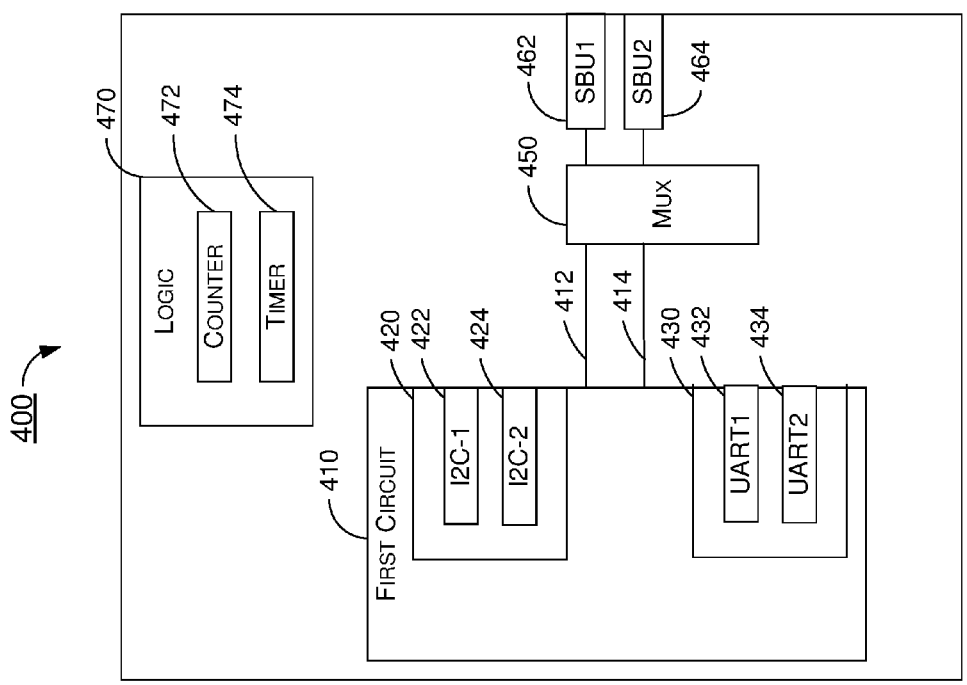
FIG. 4 is a diagram of an example device in accordance with an implementation of the present disclosure.

FIG. 4 is a diagram of an example device 400 in accordance with an implementation of the present disclosure. Referring to FIG. 4, device 400 may include a first circuit 410, a number of USB Type C connections including at least a SBU1 connection 462 and a SBU2 connection 464, and a multiplexer 450 coupled between first circuit 410 and the USB Type C connections. First circuit 410 may include either or both of an I²C bus 420 and a UART 430. The I²C bus 420 may include an I2C-1 connection 422 coupled to a first connection 412 of first circuit 410. The I²C bus may also include an I2C-2 connection 424 coupled to a second connection 414 of first circuit 410. The UART 430 may include a UART1 connection 432 coupled to first connection 412 of first circuit 410. The UART 430 may also include a UART2 connection 434 coupled to second connection 414 of first circuit 410. Multiplexer 450 may be configured to switch the SBU1 and SBU2 connections 462 and 464 of the USB Type C connector to alternatively connect to either first connection 412 or second connection 414 of first circuit 410 in response to receiving a switch signal.

Device 400 may also include a logic 470 coupled to at least one of first circuit 410, the USB Type C connections and multiplexer 450. Logic 470 may be configured to attempt to read a device ID of an external device for a number of times to detect whether the external device is successfully connected to the USB Type C connections. Logic 470 may be also configured to generate the switch signal to alternate a connection between the SBU1 and SBU2 connections 462 and 464 of the USB Type C connections and first and second connections 412 and 414 of first circuit 410 through multiplexer 450 in response to each unsuccessful attempt to read the device ID of the external device during the number of times of attempting.

In some implementations, logic 470 may include a counter 472 configured to change a count value after each unsuccessful attempt to read the device ID of the external device. Logic 470 may stop attempting to read the device ID of the external device upon the count value exceeding a threshold count. Alternatively or additionally, logic 470 may include a timer 474 configured to measure an amount of time elapsed during attempting to read the device ID of the external device. Logic 470 may stop attempting to read the device ID of the external device upon the amount of time elapsed during the attempting to read the device ID of the external device exceeding a threshold time.

In some implementations, first circuit 410 may be configured to provide a SCL signal through the I2C-1 connection 422 and provide a SDA signal through the I2C-2 connection 424. Alternatively or additionally, first circuit 410 may be configured to provide a UART_TX signal through the UART1 connection 432 and provide a UART_RX signal through the UART2 connection 434.

Figure 5:
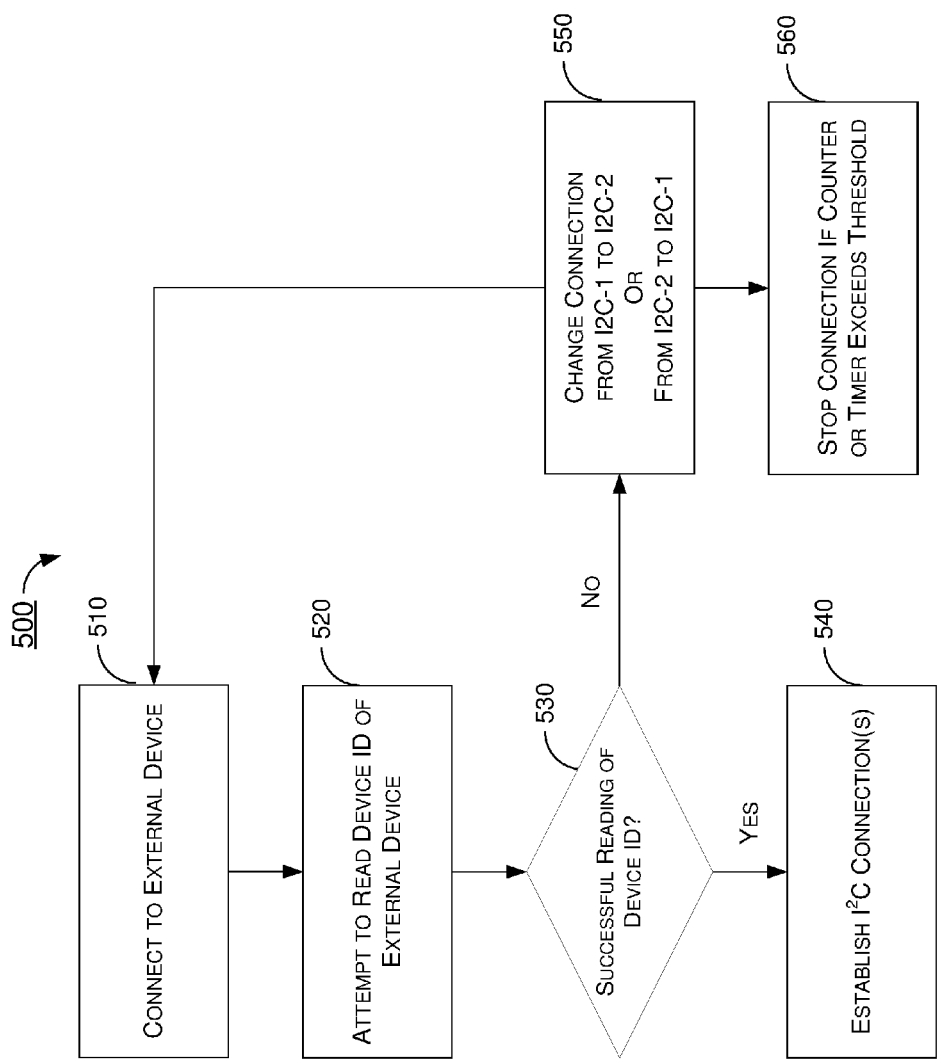
FIG. 5 is a flowchart of an example algorithm in accordance with an implementation of the present disclosure.

FIG. 5 illustrates an example algorithm 500 in accordance with an implementation of the present disclosure. Algorithm 500 may involve one or more operations, actions, or functions as represented by one or more of blocks 510, 520, 530, 540, 550 and 560. Although illustrated as discrete blocks, various blocks of algorithm 500 may be divided into additional blocks, combined into fewer blocks, or eliminated, depending on the desired implementation. Solely for illustrative purpose without limiting the scope of the present disclosure, description of algorithm 500 below is provided in the context of device 100. Algorithm 500 may begin at 510.

At 510, algorithm 500 may involve connecting to an external device. For instance, when device 100 is powered on, logic 140 may detect whether an external device is plugged into reversible-plug connector 120. Algorithm 500 may proceed from 510 to 520.

At 520, algorithm 500 may involve attempting to read the device ID of the external device. For instance, logic 140 may attempt to read the device ID of the external device for a number of times to detect whether the external device is successfully connected to reversible-plug connector 120. Algorithm 500 may proceed from 520 to 530.

At 530, algorithm 500 may involve determining whether there is a successful reading of the device ID of the external device. In an event that there is a successful reading of the device ID of the external device, algorithm 500 may proceed from 530 to 540; otherwise algorithm 500 may proceed from 530 to 550.

At 540, algorithm 500 may involve establishing I²C connection(s) with the external device. For instance, upon a successful reading of the device ID of the external device, first circuit 110 may provide a SCL signal through the I2C-1 connection and provide a SDA signal through the I2C-2 connection.

At 550, algorithm 500 may involve changing the connection from I2C-1 to I2C-2 or from I2C-2 to I2C-1. This allows the external device to be plugged into reversible-plug connector 120 in one or two ways and still be able to establish connection. Algorithm 500 may proceed from 550 to 510 to repeat the aforementioned operations. Alternatively, algorithm 500 may proceed from 550 to 560.

At 560, algorithm 500 may involve stopping the connection if a counter or a timer exceeds a threshold. For instance, logic 140 may include a counter 142 that changes a count value after each unsuccessful attempt to read the device ID of the external device, and logic 140 may stop attempting to read the device ID of the external device upon the count value exceeding a threshold count. Alternatively or additionally, logic 140 may include a timer 144 that measures an amount of time elapsed during attempting to read the device ID of the external device, and logic 140 may stop attempting to read the device ID of the external device upon the amount of time elapsed during the attempting to read the device ID of the external device exceeding a threshold time.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A device, comprising:
   a first circuit comprising a first connection and a second connection;
   a plurality of Universal Serial Bus (USB) Type C connections, comprising at least a SBU1 connection and a SBU2 connection; and
   a multiplexer coupled between the first circuit and the USB Type C connections, the multiplexer configured to switch the SBU1 and SBU2 connections of the USB Type C connections to alternatively connect to either the first connection or the second connection of the first circuit in response to receiving a switch signal.

2. The device of claim 1, further comprising:
   a logic coupled to at least one of the first circuit, the USB Type C connections and the multiplexer, the logic configured to detect whether an external device is successfully connected to the USB Type C connections and generate the switch signal according to a result of the detecting.

3. The device of claim 2, wherein the logic is configured to attempt to read a device identification (ID) of the external device for a number of times to detect whether the external device is successfully connected to the USB Type C connections.

4. The device of claim 3, wherein the logic is further configured to generate the switch signal to alternate a connection between the SBU1 and SBU2 connections of the USB Type C connections and the first and second connections of the first circuit through the multiplexer in response to each unsuccessful attempt to read the device ID of the external device during the number of times of attempting.

5. The device of claim 3, wherein the logic comprises a counter configured to change a count value after each unsuccessful attempt to read the device ID of the external device, and the logic is configured to stop attempting to read the device ID of the external device upon the count value exceeding a threshold count.

6. The device of claim 3, wherein the logic comprises a timer configured to measure an amount of time elapsed during attempting to read the device ID of the external device, and the logic is configured to stop attempting to read the device ID of the external device upon the amount of time elapsed during the attempting to read the device ID of the external device exceeding a threshold time.

7. The device of claim 1, wherein the first circuit comprises an Inter-Integrated Circuit ($I^2C$) bus, wherein the first connection comprises an I2C-1 connection of the I2C bus, and wherein the second connection comprises an I2C-2 connection of the I2C bus.

8. The device of claim 7, wherein the first circuit is configured to provide a Serial Clock Line (SCL) signal through the I2C-1 connection and provide a Serial Data Line (SDA) signal through the I2C-2 connection.

9. The device of claim 1, wherein the first circuit comprises a Universal Asynchronous Receiver/Transmitter (UART), wherein the first connection comprises a UART1 connection of the UART, and wherein the second connection comprises a UART2 connection of the UART.

10. The device of claim 9, wherein the first circuit is configured to provide a UART_TX signal through the UART1 connection and provide a UART_RX signal through the UART2 connection.

11. The device of claim 9, wherein the first circuit further comprises an Inter-Integrated Circuit ($I^2C$) bus, a third connection and a fourth connection, wherein the third connection comprises an I2C-1 connection of the I2C bus, and wherein the fourth connection comprises an I2C-2 connection of the I2C bus.

12. The device of claim 11, wherein the first circuit is configured to provide a Serial Clock Line (SCL) signal through the I2C-1 connection and provide a Serial Data Line (SDA) signal through the I2C-2 connection.

13. A device, comprising:
a first circuit comprising a first connection and a second connection;
a reversible-plug connector configured to connect to an external device in at least two ways, the reversible-plug connector comprising at least a first communication connection and a second communication connection;
a multiplexer coupled between the first circuit and the reversible-plug connector, the multiplexer configured to switch the first and second communication connections of the reversible-plug connector to alternatively connect to either the first connection or the second connection of the first circuit in response to receiving a switch signal; and
a logic coupled to at least one of the first circuit, the reversible-plug connector and the multiplexer, the logic configured to detect whether the external device is successfully connected to the reversible-plug connector and generate the switch signal according to a result of the detecting.

14. The device of claim 13, wherein the logic is configured to attempt to read a device identification (ID) of the external device for a number of times to detect whether the external device is successfully connected to the reversible-plug connector.

15. The device of claim 14, wherein the logic is further configured to generate the switch signal to alternate a connection between the first communication and second communication connections of the reversible-plug connector and the first and second connections of the first circuit through the multiplexer in response to each unsuccessful attempt to read the device ID of the external device during the number of times of attempting.

16. The device of claim 14, wherein the logic comprises a counter configured to change a count value after each unsuccessful attempt to read the device ID of the external device, and the logic is configured to stop attempting to read the device ID of the external device upon the count value exceeding a threshold count.

17. The device of claim 14, wherein the logic comprises a timer configured to measure an amount of time elapsed during attempting to read the device ID of the external device, and the logic is configured to stop attempting to read the device ID of the external device upon the amount of time elapsed during the attempting to read the device ID of the external device exceeding a threshold time.

18. The device of claim 13, wherein the first circuit comprises an Inter-Integrated Circuit ($I^2C$) bus, wherein the first connection comprises an I2C-1 connection of the I2C bus, and wherein the second connection comprises an I2C-2 connection of the I2C bus.

19. The device of claim 18, wherein the first circuit is configured to provide a Serial Clock Line (SCL) signal through the I2C-1 connection and provide a Serial Data Line (SDA) signal through the I2C-2 connection.

20. The device of claim 13, wherein the first circuit comprises a Universal Asynchronous Receiver/Transmitter (UART), wherein the first connection comprises a UART1 connection of the UART, and wherein the second connection comprises a UART2 connection of the UART.

21. The device of claim 20, wherein the first circuit is configured to provide a UART_TX signal through the UART1 connection and provide a UART_RX signal through the UART2 connection.

22. The device of claim 20, wherein the first circuit further comprises an Inter-Integrated Circuit ($I^2C$) bus, a third connection and a fourth connection, wherein the third connection comprises an I2C-1 connection of the I2C bus, and wherein the fourth connection comprises an I2C-2 connection of the I2C bus.

23. The device of claim 22, wherein the first circuit is configured to provide a Serial Clock Line (SCL) signal through the I2C-1 connection and provide a Serial Data Line (SDA) signal through the I2C-2 connection.

24. The device of claim 13, wherein the reversible-plug connector comprises a Universal Serial Bus (USB) Type C connector, wherein the first communication connection comprises a SBU1 connection of the USB Type C connector, and wherein the second communication connection comprises a SBU2 connection of the USB Type C connector.

25. A device, comprising:
a first circuit comprising either or both of an Inter-Integrated Circuit ($I^2C$) bus and a Universal Asynchronous Receiver/Transmitter (UART), the $I^2C$ bus comprising an I2C-1 connection coupled to a first connection of the first circuit, the $I^2C$ bus further comprising an I2C-2 connection coupled to a second connection of the first circuit, the UART comprising a UART1 connection coupled to the first connection of the first circuit, the UART further comprising a UART2 connection coupled to the second connection of the first circuit;
a plurality of Universal Serial Bus (USB) Type C connections, comprising at least a SBU1 connection and a SBU2 connection; and
a multiplexer coupled between the first circuit and the USB Type C connections, the multiplexer configured to switch the SBU1 and SBU2 connections of the USB Type C connector to alternatively connect to either the first connection or the second connection of the first circuit in response to receiving a switch signal.

26. The device of claim 25, further comprising:
a logic coupled to at least one of the first circuit, the USB Type C connections and the multiplexer, the logic configured to attempt to read a device identification (ID) of an external device for a number of times to detect whether the external device is successfully connected to the USB Type C connections, the logic further configured to generate the switch signal to alternate a connection between the SBU1 and SBU2 connections of the USB Type C connections and the first and second connections of the first circuit through the multiplexer in response to each unsuccessful attempt to read the device ID of the external device during the number of times of attempting.

27. The device of claim 26, wherein the first circuit is configured to provide a Serial Clock Line (SCL) signal through the I2C-1 connection and provide a Serial Data Line (SDA) signal through the I2C-2 connection.

28. The device of claim 26, wherein the first circuit is configured to provide a UART_TX signal through the UART1 connection and provide a UART_RX signal through the UART2 connection.

* * * * *